United States Patent [19]

Lachman et al.

[11] Patent Number: 5,039,644
[45] Date of Patent: Aug. 13, 1991

[54] PHOSPHATE-CONTAINING CERAMIC STRUCTURES FOR CATALYST SUPPORT AND FLUID FILTERING

[75] Inventors: Irwin M. Lachman, Corning; Jimmie L. Williams, Painted Post; Kenneth E. Zaun, Corning, all of N.Y.

[73] Assignee: Corning Incorporated, Corning, N.Y.

[21] Appl. No.: 295,774

[22] Filed: Jan. 10, 1989

[51] Int. Cl.$^5$ .................... B01J 27/18; B01J 21/06; C04R 35/49; C04B 35/46
[52] U.S. Cl. ................ 502/208; 423/213.2; 423/213.5; 423/239; 428/116; 501/103; 501/105; 501/127; 501/134; 502/209; 502/210; 502/211; 502/213; 502/214; 502/439; 502/527
[58] Field of Search ............... 502/208-214, 502/105; 581/103, 127, 134; 428/116

[56] References Cited

U.S. PATENT DOCUMENTS

| | | | |
|---|---|---|---|
| 3,876,556 | 4/1975 | Laack et al. | 502/1 |
| 4,066,572 | 1/1978 | Choca | 502/211 |
| 4,711,930 | 12/1987 | Hoelderich et al. | 502/213 |
| 4,849,275 | 7/1989 | Hamaguchi et al. | 502/527 |

Primary Examiner—Paul E. Konopka
Attorney, Agent, or Firm—Gary H. Levin; Richard N. Wardell

[57] ABSTRACT

A monolithic ceramic structure, useful as a support for catalytic material or as a fluid filter, has a high surface area phase which consists essentially of a porous metal oxide material, at least 50% by weight of which is alumina, titania, and/or zirconia, and phosphate dispersed substantially througout the porous metal oxide material. The presence of the phosphate stabilizes the porous metal oxide material against thermal degradation during sintering or exposure to elevated temperatures encountered in catalytic service and thereby aids in the retention of higher overall surface area in the monolithic structure.

23 Claims, 2 Drawing Sheets

----o---- 100% TITANIA

—△— 92% TITANIA + 8% 5TiO2.2P2O5

—o— 100% ALUMINA
--△-- 87% ALUMINA + 13% AℓPO4

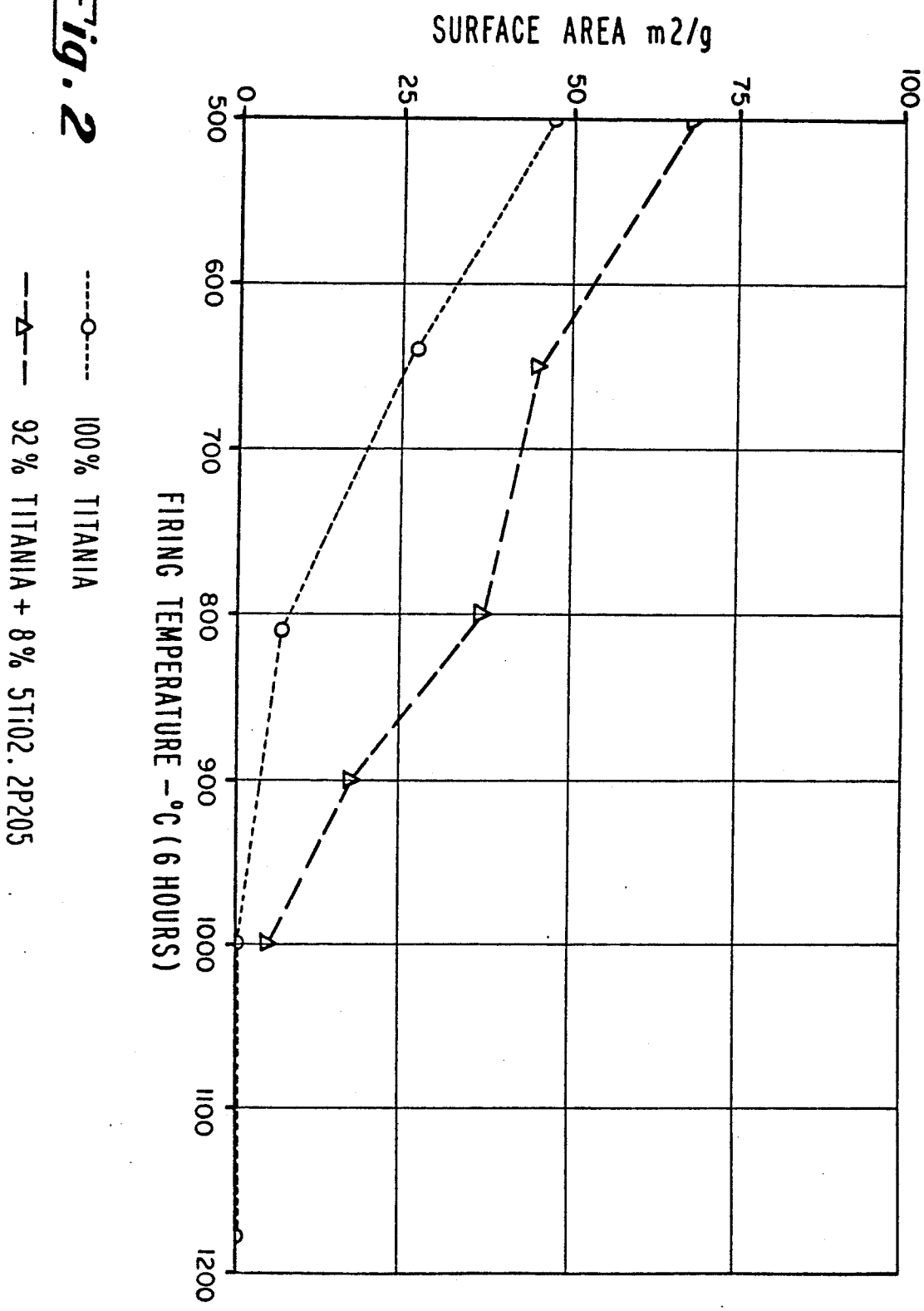

PHOSPHATE-CONTAINING CERAMIC STRUCTURES FOR CATALYST SUPPORT AND FLUID FILTERING

BACKGROUND OF THE INVENTION

This invention is directed to high surface area monolithic structures composed of sintered ceramic oxide materials which have high porosity. The structures are useful as filters for fluids and as catalytic substrates in that they provide high surface area for particular filtration or for deposition of catalytic material. The invention is more particularly directed to structures in which the ceramic material is primarily alumina, titania, or zirconia which has been modified, prior to firing or sintering, by admixture with a phosphate material that generates $P_2O_5$ upon heating. The structures are particularly useful as catalyst supports in the conversion of automotive exhausts and in reduction of NOx emissions from industrial sources, and as fluid filters, such as those used in diesel engines.

Conventional monolithic ceramic catalyst supports consist of an underlying ceramic support material with a coating of high surface area material upon which the catalyst itself is actually deposited. In particular, the ceramic support is prepared by sintering a mold of clay or other ceramic oxide (alumina, titania, cordierite, etc.) at a temperature sufficiently high to densify and strengthen the material. Temperatures high enough to result in effective sintering, however, also cause pore shrinkage and other microstructural changes that result in the sintered material's having a very low surface area. Consequently, the sintered ceramic must be coated with another material having a higher surface area, often a ceramic material itself that has not been sintered or pre-reacted, on which to actually deposit the catalyst. This procedure of applying a high surface area "wash-coat" on the low surface area ceramic wall is disclosed, for example, in U.S. Pat. Nos. 2,742,437 and 3,824,196.

In addition to the exposure to high temperature during sintering, however, catalyst support structures can also be exposed to elevated temperatures in service. The surface area of a wash-coat can be substantially degraded, and the surface area of the underlying ceramic may also further be reduced in some instances, because of the high service temperatures, such as those of automotive exhaust gases, to which they are exposed. It is therefore desirable to use ceramic materials that are, or can be modified to be, resistant to loss of surface area when exposed to elevated temperatures either during firing or service. One such material is a mixture of 50–93% by weight alumina and 7–50% by weight silica as disclosed in U.S. Pat. No. 4,631,269 (Lachman et al, issued Dec. 23, 1986).

It is an object of the present invention to provide an improved monolithic structure that can be sintered to provide structural strength and integrity without loss of appreciable surface area. It is a further object of the invention to provide a structure that resists thermal degradation of its porosity and available surface area despite exposure to elevated temperatures in catalytic conversion processes.

SUMMARY OF THE INVENTION

The present invention provides an improved monolithic structure, useful as a filter or catalyst support, comprising (1) a sintered ceramic phase of a porous metal oxide, at least 50% by weight of which is alumina, titania, and/or zirconia, and (2) about 0.5–35% by weight of $P_2O_5$ (based on the total weight of the $P_2O_5$ and the alumina, titania, and/or zirconia) substantially dispersed throughout the porous metal oxide phase. In preferred embodiments directed to its use as a catalyst support structure, the monolith further contains catalytic metals, such as transition metals (including rare earth metals), or their oxides, distributed throughout the sintered ceramic phase of porous metal oxide or on the surfaces of the porous metal oxide.

The combination of $P_2O_5$ with ceramic oxide material as described herein provides a supporting substrate for catalyst that retains high surface area and effective pore size distribution despite being subjected to the elevated temperatures of ceramic firing and catalytic service. Efficient catalytic activity, which is dependent on surface area and porosity, can therefore be maintained over longer service periods.

BRIEF DESCRIPTION OF THE DRAWINGS

FIG. 2 is a graph depicting the surface area retained, after firing, of a $P_2O_5$-containing titania material of the present invention.

DETAILED DESCRIPTION OF THE INVENTION

Figure 1:
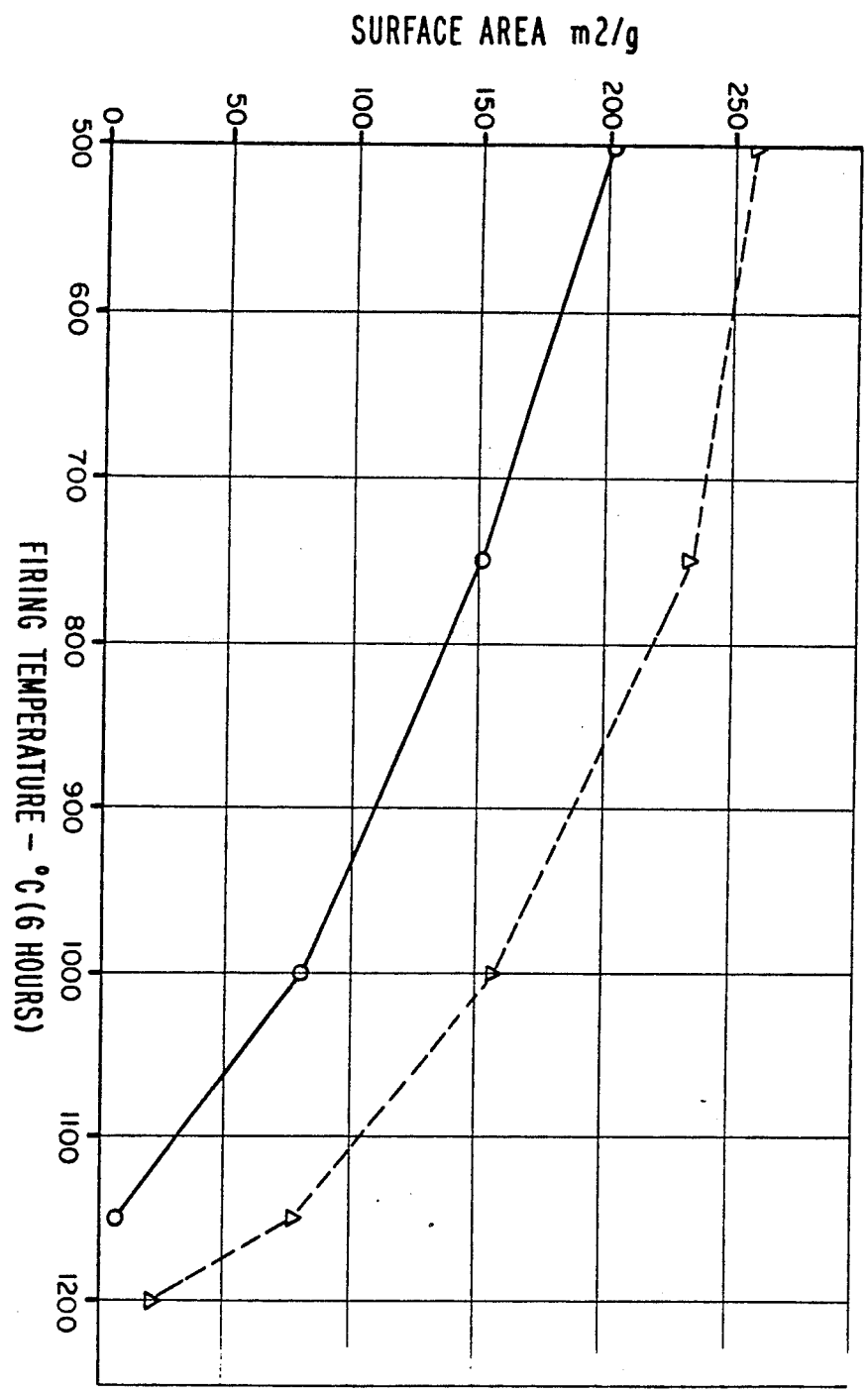
FIG. 1 is a graph depicting the surface area retained, after firing, of a $P_2O_5$-containing alumina material of the present invention.

According to the present invention, a sintered monolithic structure is provided which comprises a high surface area of porous ceramic metal oxide, at least 50% by weight of which is alumina, titania, and/or zirconia, and about 0.5–35% by weight of $P_2O_5$ or equivalent phosphate-containing compound dispersed substantially throughout the porous metal oxide material. The structure is prepared by admixing the porous oxide material and a phosphate material capable of generating $P_2O_5$ at or below the firing temperature, forming the admixture into a desired shape, and firing the shape according to conventional techniques of the ceramic arts to form a structure having substantial strength and high surface area. It has been found that the presence of the phosphate material, in intimate mixture with the ceramic porous oxide material, permits the oxide to be fired to an effective level of strength while retaining an acceptable surface area and catalytically-effective pore size distribution.

The porous oxide materials suitable for use are those which, after calcining, have a surface area of at least 20 square meters per gram, preferably at least 100 square meters per gram, and most preferably at least 200 square meters per gram. (As used herein, "calcining" means heating a material to a temperature sufficiently high to substantially eliminate volatiles but below the temperature at which the material begins to densify.) At least 50% by weight of the porous oxide material is alumina, titania, zirconia, or a mixture of these three. The balance, if any, of the porous oxide material can be any other ceramic material that has commonly been used as a catalyst support in the past and which has the above-described characteristics. Preferably, the porous oxide material is at least 75–80% by weight of alumina, titania, and/or zirconia (hereinafter, the "core metal oxides"). In particularly preferred embodiments, substantially all the porous oxide material is one or more of these core metal oxides.

The aluminas useful as the porous metal oxide are those which, upon calcining or firing, provide gamma-alumina or other transition aluminas having the specified surface area. Colloidal gamma-alumina can be used directly or materials which generate a transition alumina upon calcining, such as alpha-alumina monohydrate or alumina trihydrate, can also be used. The colloidal gamma-alumina is generally in the form of particles of 1 micron size or less. When alpha-alumina monohydrate or alumina trihydrate is used, the particle size can be from less than 1 micron up to 100 microns, but preferably less than about 75–80 microns. Suitable commercially available materials of this kind are Kaiser SA substrate alumina, CATAPAL alumina available from Vista Chemical Company, and DISPURAL alumina monohydrate from Remet Chemical Corporation.

The alumina component can also be introduced in the form of a precursor such as a hydrated alumina, a hydrolyzed aluminum alkoxide, or aluminum chlorohydrate. The hydrated aluminas are preferably in the form of an aqueous suspension and are commercially available, for example, from the Ethyl Corp. The most preferable aluminum alkoxide is hydrolyzed aluminum isopropoxide, which is commercially available as a dispersion in alcohol. For example, a dispersion of aluminum isopropoxide, 30–35% by weight in isobutanol, is available from the Alpha Products Division of Morton Thiokol Inc. Aluminum chlorohydrate is available in the form of an aqueous solution, for example, as CHLORHYDROL 50% or REHABOND CB-65S from Reheis Chemical Co. Aluminum chlorohydrate is also available in solid particulate form, for example as CHLORHYDROL Powder from Reheis Chemical Co.

High surface area titanias suitable for use as the ceramic porous metal oxide of this invention are commercially available, for example, from the Degussa Corporation as P25 $TiO_2$. The titania can also be introduced in the form of a precursor such as a suspension of an amorphous hydrated titanium oxide, which can be in the form of a hydrolyzed titanium alkoxide, such as titanium isopropoxide (tetraisopropyl titanate), or a slurry of titanium hydrate. Slurries of titanium hydrate are commercially available, for example from SCM Corp. In all cases, the solid titania or solid portion of the titania precursor is generally in particulate form with a primary particle size less than about 100 microns, preferably less than about 75–80 microns, and more preferably less than 20 microns.

The zirconia material useful in the practice of the invention can generally be in any form heretofore used in the ceramic arts. Generally, a pre-reacted zirconia in particulate form with a primary particle size in the same ranges as described immediately above is used. The zirconia can also be added in the form of a precursor. The preferred precursor is a suspension of an amorphous hydrated zirconium oxide, which can be in the form of a hydrolyzed zirconium alkoxide (such as zirconium n-propoxide) or a slurry of zirconium hydrate.

Up to 50% by weight of the porous metal oxide material of the monolith can be composed of one or more ceramic metal oxides other than the above-described core metal oxides. This component of the monolith can be any of the well-known sinterable materials capable of providing mechanical strength and thermal properties in monolithic supports as heretofore prepared by those skilled in the art. Preferably this material is selected from cordierite, mullite, clay (preferably kaolin clay), talc, spinels, silicates such as lithium alumino-silicates, alpha alumina, aluminates, aluminum titanate, aluminum titanate solid solutions, stabilized zirconias, silica, glasses, and glass ceramics. Any mixture or combination of these materials can be used.

Spinels useful in the present invention are the magnesium aluminate spinels heretofore used as catalyst supports, including spinel solid solutions in which magnesium is partially replaced by such other metals as manganese, cobalt, zirconium, or zinc. Preferred spinels are magnesium aluminate spinels having 1–7% by weight alumina in excess of 1:1 $MgO.Al_2O_3$ spinel; that is, those having about 72.0–73.5 weight percent $Al_2O_3$ (balance MgO). Spinels of this kind can be prepared by coprecipitation or wet-mixing of precursors of alumina and magnesia, followed by drying and calcining. Such a procedure is described in U.S. Pat. No. 4,239,656, the disclosure of which is hereby incorporated by reference as filed. As a supplement to this disclosure, however, it has been found that calcining of the spinels should normally not exceed 1300° C. for 2–2.5 hours. Calcining temperatures below 1200° C. are preferred. Suitable alumina precursors for preparation of the spinels are hydrolyzed aluminum alkoxides or hydrated aluminas, both of which are commercially available. Magnesium oxide component powders found to be suitable are magnesium hydroxide slurry, about 40 weight percent MgO, available from Dow Chemical Company, or hydrated magnesium carbonate.

High surface area silicas that can be used in the practice of the present invention are the amorphous silicas of about 1–10 microns or sub-micron particle size such as Cabosil ® EH-5 colloidal silica, available from Cabot Corporation. Colloidal silica derived from gels, such as Grade 952 from the Davison Chemical Division of W. R. Grace & Co. can also be used.

Cordierite, one of the preferred ceramic materials for use as the additional substrate material herein, can be in the precursor or "raw" form which becomes true cordierite upon heating, or can be used in pre-reacted form. When raw cordierite is used, it is preferred that up to 10% by weight, based on cordierite weight, of $B_2O_3$ be added to the batch to initiate cordierite formation at lower than usual temperatures and to impart additional strength.

Unless otherwise specified above, these additional ceramic materials should be in particulate form, preferably of a size finer than 200 mesh (U.S. Standard) and more preferably finer than 325 mesh (U.S. Standard). With such characteristics, the ceramic material can be more easily sintered, during the subsequent formation of the monolith, at temperatures below those at which surface area of these materials, as well as the core metal oxides, might be adversely affected.

The phosphate component of the invention is incorporated into the monolith by admixing into the starting batch a compound capable of generating $P_2O_5$ at or below the firing or sintering temperature to be used. The source of the phosphate is not critical. Phosphoric anhydride itself or phosphoric acid can be added, or a phosphate precursor, preferably one soluble in water, can be used. Preferred precursors of this kind are $(NH_4)_2HPO_4$ (dibasic ammonium phosphate) and $Al(H_2PO_4)_3$ (aluminum dihydrogen phosphate).

Generally, the phosphate material is added to the batch in an amount that will provide about 0.5–35% by weight of $P_2O_5$, based on the combined weights of $P_2O_5$ and the core porous oxides. Preferably, the final weight of $P_2O_5$ in the monolith will be about 1–25 weight percent. When substantially all of the core porous oxide is alumina, a more preferred final weight percentage of $P_2O_5$ is about 1–10%, and most preferably 3–7%. When the core porous oxide is substantially all titania, a more preferred final weight percentage of $P_2O_5$ is about 1.5–15%, and most preferably about 3–10%. When substantially all of the core porous oxide is zirconia, a more preferred final weight percentage of $P_2O_5$ is about 1.5–15%.

The monolithic structures of this invention are prepared by admixing into a substantially homogeneous batch (a) the porous metal oxide material, (b) the phosphate-generating material, and optionally (c) a temporary binder. Preferably, 1–30% by weight of temporary binder, based on the total batch weight, is used. Any binder material conventionally used in ceramic catalyst support manufacture is suitable. Preferred are binders that are decomposed and burned-off at temperatures of about 250°–600° C. Examples are disclosed in: "Ceramic Processing Before Firing," ed/by George Y. Onoda, Jr. & L. L. Hench, John Wiley & Sons, New York; "Study of Several Groups of Organic Binders Under Low-Pressure Extrusion," C. C. Treischel & E. E. Emrich, Jour. Am. Cer. Soc. (29), pp. 129–132, 1946; "Organic (Temporary) Binders for Ceramic Systems," S. Levine, Ceramic Age, (75) No. 2, pp. 39+, January 1960; and "Temporary Organic Binders for Ceramic Systems" S. Levine, Ceramic Age, (75) No. 2, pp. 25+, February 1960. The most preferred binder is methyl cellulose, available as METHOCEL A4M from the Dow Chemical Co.

Mixing of the batch ingredients is preferably performed in a step-wise procedure in which any dry ingredients are first blended together. This preliminary dry-blending operation can be performed in any conventional mixing equipment, but the use of a Littleford intensive mixer is preferred. The dry mixture is then plasticized by being further mixed, preferably in a mix muller, with a liquid medium (preferably water) which acts as a plasticizer. During this stage, all remaining constituents are added. Up to about 1% by weight, based upon total mixture weight, of a surfactant such as sodium stearate can also be added to facilitate mixing and flow for subsequent processing. Mixing of all constituents should be continued until a homogeneous or substantially homogeneous plasticized mass is obtained.

To effect further mixing, the plasticized batch can be extruded through a "spaghetti" die one or more times. Ultimately, the batch is formed into the desired "green" shape for the monolithic structure, preferably by extrusion through a die or by injection molding. The material processing method of this invention is particularly well suited to the preparation of structures in the shape of thin-walled honeycombs and wagon-wheels. The preferred shape is that of a honeycomb having about 25–2400, more preferably 200–400, through-and-through cells per square inch of frontal surface area (equivalent to about 4–370, more preferably about 30–60, cells per square centimeter of surface area).

Finally, the "green" structures are fired in order to harden the material. The firing step generally takes place at 500°–1200° C., although the use of temperatures below about 1100° C. are preferred. For most ceramic materials, the temperature selected and the duration of the firing period will result in actual sintering of the material. This is preferred but not necessary. The strength requirements of the intended end use of the structure will determine for the skilled artisan whether the additional densification and hardening provided by fully sintering the material will be necessary. The firing/sintering step can be conducted in an inert atmosphere or in one which promotes either reduction or oxidation, depending on the presence and identity of catalytically active metal compounds in the batch, as discussed more fully below. Optionally, the firing/sintering step can be preceded by drying the shapes at about 100°–120° C., preferably by steam heat.

In the fired article, the $P_2O_5$ is dispersed substantially throughout the porous metal oxide material. As those skilled in the art will recognize, however, the $P_2O_5$ may not necessarily exist as a free phase but may combine with the porous metal oxide materials to form phosphate compounds or complexes. For example, $AlPO_4$ and $5TiO_2.2P_2O_5$ are the common result of firing a phosphate-generating material with alumina and titania, respectively. In one particularly preferred embodiment of this invention, the final monolith consists essentially of alumina and about 4–23% by weight $AlPO_4$. In another particularly preferred embodiment, the final structure consists essentially of titania and about 5–12% by weight $5TiO_2.2P_2O_5$. The presence of $P_2O_5$ dispersed substantially throughout the ceramic metal oxide material aids its retention of high surface area despite elevated firing, sintering, or service temperatures. This benefit is illustrated in the Figures. With particular reference to FIG. 1, there is shown a graph of temperatures versus surface area retained after a 6-hour heat soak for a batch material consisting of 100% alumina and a batch material consisting of 87% by weight alumina and 13% by weight $AlPO_4$. In FIG. 2 there is shown a graph of temperature versus surface area retained after a 6-hour heat soak for a batch material of 100% titania and a batch material of 92% by weight titania and 8% by weight $5TiO_2.2P_2O_5$. In both cases, the surface area retained after firing is shown to be greater for the phosphate-containing material than for the control.

The monolithic supports of this invention may have some catalytic activity of their own by virtue of the chemistry and structure of the high surface area phosphate-containing porous oxide phases. Nevertheless, the support structures of this invention are also intended to carry additional catalytically active ingredients on the surfaces thereof. (As used herein, the term "surfaces" refers to those surfaces of the monolithic support, including surfaces forming the pore cavities, that are normally intended to be in contact with the work stream of material to be catalyzed.) This catalytically active material can be any of the metallic catalysts heretofore used for NOx reduction, for general chemical processing, or for automotive exhaust catalysis. Preferred catalytic materials are the transition metals (including the rare earth metals) and metals of Group IIB. The metals can be used in elemental form or in the form of their oxides. Preferred metals are zinc and such transition metals as tungsten, platinum, palladium, molybdenum, iron, manganese, vanadium, and copper. These additional catalytic ingredients can be deposited on the surfaces of the monolith by methods well known in the art, such as by preparing a solution or slurry of the materials for spraying, dip-coating, or impregnating the monolithic support.

In a particularly preferred embodiment, however, the additional catalytic ingredient is admixed directly into the original batch and then co-extruded and sintered with the porous metal oxide material and phosphate material. Generally the catalytic material is incorporated into the batch in an amount of about 3-20 weight percent, preferably 5-10 weight percent, based on the total batch weight. In this embodiment, it is preferred that the admixed catalytic material be in particulate form with a primary particle size no greater than about 20 microns, preferably no greater than about 2.0 microns, and most preferably no greater than about 1.5 microns. In one embodiment of the invention, this reduced particle size is obtained by slurrying the oxide of the catalytic metal, or a precursor therefor, with distilled water, and then adjusting the pH and heating to dissolve the material. After all the material is dissolved, a portion of the ceramic oxide material to be used in the monolithic catalyst support is added to the solution. The resultant mixture is then neutralized, with a slight excess of the required acid or base, to precipitate very fine particles of the catalytic metal oxide so that they are substantially intimately admixed with particles of the porous ceramic oxide. The solids are separated by centrifugation and the resultant wet cake is then admixed with additional porous metal oxide material and phosphate material to prepare the monolith as earlier described. As a further alternative, the wet cake remaining after centrifugation can be calcined at a temperature of about 250°-300° C. The calcined material is then milled to a size finer than 100 mesh, preferably finer than 200 mesh. In this form, the material contains very fine particles (generally less than about 2.0 micron) of catalytic material intimately admixed with finely divided particles of the porous metal oxide material. The monolith is then prepared by admixing this calcined and milled material, as earlier described, with additional porous metal oxide material and phosphate material.

In another aspect of this invention, a composite monolith is provided in which a high surface area support phase, consisting essentially of the core metal oxides and 0.5-35% by weight of the phosphate material, is combined with a separate phase of ceramic material that, upon sintering, provides the actual structural integrity and strength to the monolith. In this embodiment, a pre-formed mixture of the core porous oxide material and phosphate material is coextruded with the sinterable ceramic structural material in a single step, so that the two phases are physically integrated in their green states, but the high surface area phase remains as a separate and discrete phase within the ceramic matrix after the monolith is fired. Composite monoliths of this kind, in which the high surface area support phase is a specific mixture of alumina and silica, are disclosed in U.S. Pat. No. 4,631,269 issued Dec. 23, 1986, to Lachman et al. The disclosures of this patent, which are hereby incorporated by reference, can be followed to prepare composite monoliths in which the high surface area support phase is the mixture of core porous metal oxide and phosphate material of the present invention.

The following examples are illustrative, but not limiting, of the invention.

EXAMPLE 1

Three batches of phosphate-containing alumina material (designated below as 1A, 1B, and 1C) and one control batch (100% alumina, no phosphate addition) were prepared, extruded, shaped into honeycomb monoliths, and sintered, and their properties tested. The phosphate-containing monoliths were prepared from batch ingredients as follows:

| Ingredient | Composition (parts by weight) | | |
|---|---|---|---|
| | Ex. 1A | Ex. 1B | Ex. 1C |
| $Al_2O_3.H_2O$ (CATAPAL-B, Vista Chem. Co.) | 87.4 | 92.06 | 76.94 |
| $Al_2(OH)_5Cl$ (CHLORHYDROL 50%, aqueous solution, Reheis Chem. Co.) | — | — | 8.16 |
| $Al(H_2PO_4)_3$ solution (50% in water) | 12.6 | — | 14.9 |
| $(NH_4)2HPO_4$ (Baker Chem. Co.) | — | 7.94 | — |
| METHOCEL (Dow Chem. Co.) | 6.0 | 6.0 | 6.0 |
| Distilled water | 38.3 | 40.8 | 35.0 |

In each case, the ingredients were combined in a mix muller and the batch mixed until substantial homogeneity and plasticity were attained. The batch was extruded through a "spaghetti" die two times and then through a shaping die to form honeycomb monoliths of 1-inch (2.54 cm) diameter having 200 square cells per square inch (about 30 cells per square centimeter). The "control" material was prepared by forming a slurry of 83.5 parts by weight distilled water, 15 parts alumina monohydrate (DISPURAL, Remet Chem Corp.) and 1.5 parts acetic acid. 40 parts by weight of this slurry were then combined, in a mix muller, with a previously-made mixture of 100 parts by weight CATAPAL-B alumina monohydrate, 6 parts METHOCEL, and 16 parts distilled water. The batch was mixed and extruded to form a honeycomb as described above. In all cases, the honeycombs were fired at temperatures from 500°-1200° C. for six hours and their surface area ($m^2/g$) measured by BET. For strength determination, rods of the batch material (approximately 1.3 cm in diameter) were also extruded and fired according to the same schedule, and the modulus of rupture (MOR) of the material was determined as described in U.S. Pat. No. 4,631,267. The results are shown in Table 1 below.

TABLE 1

| Firing Schedule (6 hours) | EX. 1A | | EX. 1B | | EX. 1C | | Control |
|---|---|---|---|---|---|---|---|
| | SA ($m^2/g$) | MOR (psi) | SA ($m^2/g$) | MOR (psi) | SA ($m^2/g$) | MOR (psi) | SA ($m^2/g$) |
| 500° C. | 221.9 | 666 | 226.7 | 1930 | 217.1 | 992 | 190.0 |
| 750° C. | 200.9 | 560 | 203.6 | 2060 | 197.5 | 1143 | 139.4 |
| 1000° C. | 125.2 | 903 | 128.3 | 1540 | 133.1 | 649 | 84.4 |
| 1100° C. | 99.6 | 764 | 100.0 | 1860 | 94.7 | 716 | 6.1 |
| 1200° C. | 18.3 | 1840 | 15.6 | 5440 | 14.8 | 2203 | — |

EXAMPLE 2

Batches of alumina material with varying amounts of phosphate material addition (designated below as Examples 2A-2F) and a control (100% alumina) were prepared by admixing the materials shown in Table 2 below and extruding the batched materials to form honeycombs. In examples 2A-2F, the indicated alumina and phosphate materials were combined in a mix muller with 6.0 parts by weight of METHOCEL and a sufficient amount of distilled water to provide plasticization. The "control" material was prepared and extruded as described in Example 1. The extruded honeycombs were then fired for 6 hours at 1000° C. and 1200° C. For each example, Table 2 provides the alumina and phosphate batch ingredients as well as the composition and BET surface area of the fired material.

TABLE 2

| Example | Batch Composition (parts by weight) | | Fired Composition (weight %) | |
|---|---|---|---|---|
| | $(NH_4)_2HPO_4$ | $Al_2O_3 \cdot H_2O$ | Al | $AlPO_4$ |
| 2A | 2 | 98 | 97.5 | 2.5 |
| 2B | 5 | 95 | 93.8 | 6.2 |
| 2C | 8 | 92 | 89.9 | 10.1 |
| 2D | 16 | 84 | 79.3 | 20.7 |
| 2E | 24 | 76 | 68.3 | 31.7 |
| 2F | 40 | 60 | 44.5 | 55.5 |
| Control | 0 | 100 | 100 | 0 |

| Example | Surface Area (1000° C.) ($m^2/g$) | Surface Area (1200° C.) ($m^2/g$) |
|---|---|---|
| 2A | 116.1 | 22.4 |
| 2B | 127.0 | 29.2 |
| 2C | 136.0 | 29.2 |
| 2D | 129.4 | 16.3 |
| 2E | 77.1 | 7.9 |
| 2F | 0.6 | 0.3 |
| Control | 86.8 | 6.1 |

EXAMPLE 3

Batches of titania material with varying amounts of phosphate material addition (designated below as Examples 3A-I) and a control (100% titania) were prepared by admixing the materials shown in Table 3 below, according to the procedure described in Example 1. In Examples 3A-I, the indicated titania and phosphate materials were combined in a mix muller with 6.0 parts by weight of METHOCEL and a sufficient amount of distilled water to provide plasticization. The "control" material was prepared in similar fashion with the exception that no phosphate material was added to the batch. In all cases, the batched material was dried at 110° C. and then fired for 6 hours at 800° C. For each example, Table 3 provides the titania and phosphate batch ingredients as well as the composition and BET surface area of the fired material.

TABLE 3

| Example | Batch Composition (parts by weight) | | Fired Composition (weight %) | | Surface Area ($m^2/g$) |
|---|---|---|---|---|---|
| | $(NH_4)_2HPO_4$ | $TiO_2$ | $P_2O_5$ | $TiO_2$ | |
| 3A | 60 | 40 | 44.6 | 55.4 | 3.3 |
| 3B | 40 | 60 | 26.4 | 73.6 | 12.4 |
| 3C | 30 | 70 | 18.7 | 81.3 | 20.5 |
| 3D | 20 | 80 | 11.8 | 88.2 | 25.9 |
| 3E | 10 | 90 | 5.6 | 94.4 | 34.8 |
| 3F | 8 | 92 | 4.5 | 95.5 | 35.3 |
| 3G | 6 | 94 | 3.3 | 96.7 | 36.6 |
| 3H | 4 | 96 | 2.1 | 97.9 | 36.3 |
| 3I | 2 | 98 | 1.1 | 98.9 | 30.8 |
| Control | 0 | 100 | 100 | 0 | 3.0 |

EXAMPLE 4

A suspension of 36 grams of zinc oxide in 1200 ml of distilled water was prepared. To this suspension was added 108 ml of concentrated hydrochloric acid. The resultant mixture was heated, with stirring, until all of the zinc oxide had dissolved. To this solution was then added 490.2 grams of titanium dioxide (Degussa Corp. P25) and the mixture was then neutralized with 108 ml of concentrated ammonium hydroxide, which caused a precipitation of the zinc oxide. The precipitated solution was centrifuged three times at 7000 rpm for 15 minutes, and the recovered solids material was transferred to an evaporating dish and heated at 110° C. until dry. The dried material was calcined for 3 hours at 300° C. and the calcined material then ball milled to a particle size finer than 100 mesh. The calcined and milled material was dry-mixed with 36 grams of METHOCEL binder and placed in a mix muller, into which was further charged a previously prepared solution of 37 grams of ammonium biphosphate dissolved in 75 ml of distilled water. Tetraisopropyl titanate, 199.8 grams, was then added to the muller, and the resulting batch was mixed in the presence of sufficient additional distilled water to plasticize the mixture. The plasticized material was extruded through a "spaghetti" die and then through a final die to form a honeycomb shape having 300 square cells per square centimeter of frontal surface area. The extruded honeycombs were dried at 60° C. for 48-72 hours and then at 110° C. for 24 hours, after which they were fired at 500° C. for 6 hours.

EXAMPLE 5

A suspension of 30 grams of ferric oxide ($Fe_2O_3$) in 1200 ml of distilled water was prepared. To this suspension was added 600 ml of concentrated hydrochloric acid. The resultant mixture was heated, with stirring, until all of the ferric oxide had dissolved. To this solution was then added 514.8 grams of titanium dioxide (Degussa Corp. P25) and the mixture was then neutralized with 600 ml of 50% sodium hydroxide (aqueous), which caused a precipitation of the ferric oxide. The precipitated solution was centrifuged at 7000 rpm for 15 minutes. Centrifuging was repeated three times and the recovered solids material was transferred to an evaporating dish and heated at 110° C. until dry. The dried material was calcined for 3 hours at 300° C. and the calcined material then ball milled to a particle size finer than 100 mesh. The calcined and milled material was dry-mixed with 36 grams of METHOCEL binder and placed into a mix muller, into which was further charged a previously prepared solution of 37 grams ammonium biphosphate in 75 ml of distilled water. Tetraisopropyl titanate, 200 grams, was added to the muller and the resulting batch was mixed in the presence of sufficient additional distilled water to plasticize the mixture. The plasticized material was extruded through a "spaghetti" die and then through a final die to form a honeycomb shape having about 30 square cells per square centimeter of frontal surface area. The extruded honeycombs were dried at 60° C. for 48-72 hours and then at 110° C. for 24 hours, after which they were fired at 500° C. for 6 hours.

EXAMPLE 6

A suspension of 36 grams of manganese dioxide in 1200 ml of distilled water was prepared. To this suspension was added 828 ml of concentrated hydrochloric acid. The resultant mixture was heated with stirring until all of the manganese dioxide had dissolved. To this solution was then added 490.2 grams of titanium dioxide (Degussa Corp. P25) and the mixture then neutralized with 792 ml of concentrated ammonium hydroxide, which caused a precipitation of the manganese dioxide.

The precipitated solution was centrifuged at 7000 rpm for 15 minutes. Centrifuging was repeated three times and the recovered solids material was transferred to an evaporating dish and heated at 110° C. until dry. The dried material was calcined for 3 hours at 300° C. and the calcined material then ball milled to a particle size finer than 100 mesh. The calcined and milled material was dry-mixed with 36 grams of METHOCEL binder and placed into a mix muller, into which was further charged a previously prepared solution of 37 grams ammonium biphosphate in 75 ml of distilled water. Tetraisopropyl titanate, 200 grams, was added to the muller and the resulting batch was mixed in the presence of sufficient additional distilled water to plasticize the mixture. The plasticized material was extruded through a "spaghetti" die and then through a final die to form a honeycomb shape having 200 square cells per square inch of frontal surface area. The extruded honeycombs were dried at 60° C. for 48-72 hours and then at 110° C. for 24 hours, after which they were fired at 500° C. for 6 hours.

What is claimed is:

1. A fired monolithic structure consisting of
   A) 80-100% by weight of a sintered ceramic phase of
      (a) a porous metal oxide material consisting of (i) 50-100% by weight of titania, zirconia, titania-zirconia mixtures, titania-alumina mixtures, zirconia-alumina mixtures, or zirconia-alumina-titania mixtures; and (ii) 0-50% by weight of a ceramic metal oxide material other than alumina, titania, or zirconia; and
      (b) $P_2O_5$ substantially dispersed throughout the porous metal oxide material in an amount of about 0.5-15% by weight, based on the total weight of the $P_2O_5$ and component (i); and
   B) 0-20% by weight of catalytic material selected from the group consisting of catalytic metal and catalytic metal oxide.

2. The monolithic structure of claim 1 in which said porous metal oxide material consists of 80-100% by weight of the oxides of component (i) and 0-20% by weight of the oxides of component (ii).

3. The monolithic structure of claim 1 in which substantially all the porous metal oxide material is titania and in which said sintered ceramic phase consists of about 1.5-15 weight percent $P_2O_5$, based on the total weight of titania and $P_2O_5$.

4. The monolithic structure of claim 1 in which substantially all the porous metal oxide material is titania, substantially all the $P_2O_5$ is in the form of $5TiO_2.2P_2O_5$, and said $P_2O_5$ compound constitutes about 5-12 weight percent of the structure.

5. The monolithic structure of claim 1 in which substantially all the porous metal oxide material is zirconia and in which said sintered ceramic phase consists of about 1-15 weight percent $P_2O_5$, based on the total weight of zirconia and $P_2O_5$.

6. The monolithic structure of claim 2 which is in the form of a catalyst support and which consists of 3-20% by weight of said catalytic material, said catalytic material being selected from the group consisting of transition metals, Group IIB metals, and oxides of these.

7. The monolithic catalyst support of claim 6 wherein the catalytic material is selected from the group consisting of zinc, molybdenum, vanadium, manganese, tungsten, copper, iron, platinum, palladium, and oxides of these.

8. The monolithic catalyst support of claim 6 wherein the catalytic material is selected from the group consisting of platinum, palladium, platinum oxide, palladium oxide, and mixtures of these.

9. The monolithic structure of claim 2 which is a fluid filter in the form of a honeycomb having about 4-370 cells per square centimeter of surface area.

10. The monolithic structure of claim 1 in which said ceramic metal oxide material of component (ii) is present in an amount up to 50% by weight of said porous metal oxide material and is selected from the group consisting of cordierite, mullite, clay, talc, spinels, silicates, aluminates, aluminum titanates, aluminum titanate solid solutions, silica, glasses, glass ceramics, and mixtures of these.

11. A method of producing a fired monolithic structure comprising the steps of:
   A) admixing, into a substantially homogeneous batch, components consisting of
      (1) 80-100% by weight of ceramic phase material consisting of
         (a) a porous metal oxide material consisting of (i) 50-100% by weight of titania, zirconia, titania-alumina mixtures, zirconia-alumina mixtures, or zirconia-alumina-titania mixtures; and (ii) 0-50% by weight of a sinterable ceramic metal oxide material other than alumina, titania, or zirconia; and
         (b) $P_2O_5$ or a precursor therefor in an amount sufficient to provide, after firing, about 0.5-15% by weight of $P_2O_5$ based on the total weight of the $P_2O_5$ and component (a)(i); and
      (2) 0-20% by weight of at least one catalytic material selected from the group consisting of catalytic metal and catalytic metal oxide;
   B) forming said batch into a desired shape; and
   C) firing the shape.

12. The method of claim 11 in which said porous metal oxide material consists of 80-100% by weight of the oxides of component (i) and 0-20% by weight of the oxides of component (ii).

13. The method of claim 11 in which the $P_2O_5$ is admixed into said batch in the form of phosphoric acid, dibasic ammonium phosphate, or alumina dihydrogen phosphate.

14. The method of claim 11 in which substantially all the porous metal oxide material is titania and in which sufficient $P_2O_5$ material is provided to generate about 1.5-15 weight percent $P_2O_5$ in the monolith following firing.

15. The method of claim 11 in which substantially all the porous metal oxide material is zirconia and in which sufficient $P_2O_5$ is provided to generate about 1-15 weight percent $P_2O_5$ in the monolith following firing.

16. The method of claim 12 in which said batch consists of 3-20% by weight of said catalytic material, said catalytic material being selected from the group consisting of transition metals, Group IIB metals, and oxides thereof, and said catalytic material being in particulate form with an average primary particle size of up to about 20 microns.

17. The method of claim 16 in which said catalytic material has an average primary particle size of up to about 2.0 microns and is selected from the group consisting of zinc, vanadium, molybdenum, tungsten, palladium, platinum, iron, manganese, copper, and oxides of these.

18. The method of claim 16 in which said catalytic material consists of platinum, palladium, platinum oxide, palladium oxide, or a mixture of these.

19. The method of claim 11 in which said ceramic metal oxide material of component (ii) is present in an amount up to 50% by weight of said porous metal oxide material and is selected from the group consisting of cordierite, mullite, clay, talc, spinels, silicates, aluminates, aluminum titanate, solid solutions of aluminum titanate, silica, glasses, glass ceramics, and mixtures of these.

20. A composite monolithic catalyst support structure consisting of
A) 80-100% by weight of a ceramic support material that is
  (a) a sintered material consisting of (i) 50-100% by weight of titania, zirconia, titania-zirconia mixtures, titania-alumina mixtures, zirconia-alumina mixtures, or zirconia-alumina-titania mixtures; and (ii) 0-50% by weight of a ceramic metal oxide material other than alumina, titania, or zirconia, wherein components (i) and (ii) exist as separate phases; and
  (b) $P_2O_5$ substantially dispersed throughout the phase of component (i) in an amount of about 0.5-15% by weight, based on the total weight of the $P_2O_5$ and component (i); and
B) 0-20% by weight of at least one catalytic material selected from the group consisting of catalytic metal and catalytic metal oxide.

21. The composite structure of claim 20 in which substantially all of component (i) is titania and in which said $P_2O_5$ is present in an amount of about 1.5-15% by weight, based on the total weight of the $P_2O_5$ and titania.

22. The composite structure of claim 20 in which substantially all of component (i) is zirconia and in which said $P_2O_5$ is present in an amount of about 1-15% by weight, based on the weight of the $P_2O_5$ and zirconia.

23. The composite structure of claim 20 in which component (ii) is present in an amount up to 50% by weight of said sintered material (a) and is selected from the group consisting of cordierite, mullite, clay, talc, spinels, silicates, aluminates, aluminum titanate, solid solutions of aluminum titanate, silica, glasses, glass ceramics, and mixtures of these.

* * * * *

UNITED STATES PATENT AND TRADEMARK OFFICE
CERTIFICATE OF CORRECTION

PATENT NO. : 5,039,644

DATED : Aug. 13, 1991

INVENTOR(S) : Irwin M. Lachman, Jimmie L. Williams, Kenneth E. Zaun

It is certified that error appears in the above-identified patent and that said Letters Patent is hereby corrected as shown below:

On the title page:

In Abstract, line 6, -- througout --
should read -- throughout --.

Signed and Sealed this

Second Day of February, 1993

Attest:

STEPHEN G. KUNIN

*Attesting Officer*      Acting Commissioner of Patents and Trademarks